United States Patent
Kuroe et al.

(10) Patent No.: US 7,168,732 B2
(45) Date of Patent: Jan. 30, 2007

(54) COMPACT VEHICLE

(75) Inventors: Takeshi Kuroe, Saitama (JP); Toshio Yamagiwa, Saitama (JP); Satoshi Iijima, Saitama (JP); Toyokazu Nakamura, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/374,040

(22) Filed: Feb. 27, 2003

(65) Prior Publication Data
US 2003/0218320 A1 Nov. 27, 2003

(30) Foreign Application Priority Data
Mar. 1, 2002 (JP) ............................. 2002-055593

(51) Int. Cl.
*B60R 21/16* (2006.01)
*B60R 21/20* (2006.01)

(52) U.S. Cl. .................................. 280/730.1
(58) Field of Classification Search .............. 280/730.1
See application file for complete search history.

(56) References Cited

U.S. PATENT DOCUMENTS

| 5,306,042 | A |   | 4/1994 | Frank |   |
|---|---|---|---|---|---|
| 5,967,545 | A | * | 10/1999 | Iijima et al. ............. | 280/730.1 |
| 6,113,133 | A | * | 9/2000 | Iijima et al. ............. | 280/730.1 |
| 6,793,033 | B2 | * | 9/2004 | Yamazaki et al. .......... | 180/268 |
| 6,846,009 | B2 | * | 1/2005 | Kuroe et al. ............. | 280/730.1 |
| 6,857,495 | B2 | * | 2/2005 | Sawa ..................... | 280/730.1 |
| 6,877,772 | B2 | * | 4/2005 | Fischer et al. ........... | 280/730.1 |
| 6,913,280 | B2 | * | 7/2005 | Dominissini et al. ..... | 280/730.1 |
| 7,029,029 | B2 | * | 4/2006 | Yamazaki et al. ........ | 280/730.1 |
| 2003/0214122 | A1 | * | 11/2003 | Miyata ................... | 280/730.1 |
| 2004/0007855 | A1 | * | 1/2004 | Kurata et al. ............ | 280/729 |
| 2004/0207182 | A1 | * | 10/2004 | Miyata ................... | 280/730.1 |
| 2004/0207184 | A1 | * | 10/2004 | Miyata ................... | 280/730.1 |
| 2004/0207185 | A1 | * | 10/2004 | Miyata ................... | 280/730.1 |
| 2004/0251664 | A1 | * | 12/2004 | Miyata ................... | 280/730.1 |
| 2005/0040628 | A1 | * | 2/2005 | Miyata ................... | 280/730.1 |

FOREIGN PATENT DOCUMENTS

DE  100 04 307 A1  8/2001
JP  2001-219884 A  8/2001

* cited by examiner

*Primary Examiner*—Paul N. Dickson
*Assistant Examiner*—Joselynn Y. Sliteris
(74) *Attorney, Agent, or Firm*—Birch, Stewart, Kolasch & Birch, LLP

(57) ABSTRACT

In a compact vehicle in which a vehicular component engaged with an inflated and extended air bag is arranged in the inflated and extended range of the air bag that can constrain a rider on a seat provided to the rear of a body frame from a forward direction, even if there is the vehicular component engaged with the air bag in an inflated and extended state, space for the air bag to be fully inflated and extended is secured and in addition, the inflated and extended air bag is securely supported. A vehicular component can be turned between an inactuated position in which an air bag is folded and an actuated position in which the vehicular component is displaced from the inactuated position, being engaged with and supporting a part of the inflated and extended air bag and is supported by fixed supporting means.

22 Claims, 6 Drawing Sheets

COMPACT VEHICLE

CROSS-REFERENCE TO RELATED APPLICATIONS

The present non-provisional application claims priority under 35 USC 119 to Japanese Patent Application No. 2002-055593 filed on Mar. 1, 2002 the entire contents thereof is hereby incorporated by reference.

BACKGROUND OF THE INVENTION

1. Field of the Invention

The present invention relates to a compact vehicle in which a vehicular component engages an inflated and extended air bag that is arranged in the inflated and extended range of the air bag to constrain a rider on a seat provided to the rear of a body frame from a forward direction.

2. Description of Background Art

Heretofore, in a motorcycle disclosed in Japanese published unexamined patent application No. 2001-219884 for example, a windscreen is arranged in a position that engages inflated and extended air bag from a forward direction.

However, in the conventional type air bag described above, the inflation and extension of the air bag is interfered with by the windscreen and the space in which the air bag is fully inflated and extended may be prevented from being secured.

SUMMARY AND OBJECTS OF THE INVENTION

The invention is made in view of such a situation and it is an object is to provide a compact vehicle where even if there is a vehicular component is engaged by an air bag in an inflated and extended state, the space in which the air bag can be fully inflated and extended is secured and in addition, the inflated and extended air bag can be securely supported.

To achieve the object, the invention according to a first aspect is based upon a compact vehicle wherein vehicular components are adjacent to an inflated and extended air bag that are arranged in the inflated and extended range of the air bag that can constrain a rider on a seat provided to the rear of a body frame from a forward direction. The vehicular components can be turned between an inactuated position in which the air bag is folded and an actuated position in which the vehicular components are displaced from the inactuated position, being engaged with and supporting a part of the inflated and extended air bag and are supported by fixed supporting means.

According to such a configuration, as the vehicular components engaged with the inflated and extended air bag are turned in the inflated and extended direction of the air bag from the inactuated position to the actuated position when the air bag is inflated and extended, the space in which the air bag is inflated and extended can be fully secured. In addition, as the vehicular components are also engaged with the air bag and support it in the actuated position, the vehicular components can securely support the air bag under a load which acts on the air bag from the rider.

Besides, the invention according to a second aspect includes a vehicular component that is a windscreen arranged in front of the rider on the seat, and according to such configuration, a space in which an air bag is inflated and extended forward can be fully secured.

Further, the invention according to a third aspect includes a vehicular component that is a steering handlebar, and according to such configuration, a space in which an air bag is inflated and extended forward or sideway can be fully secured.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
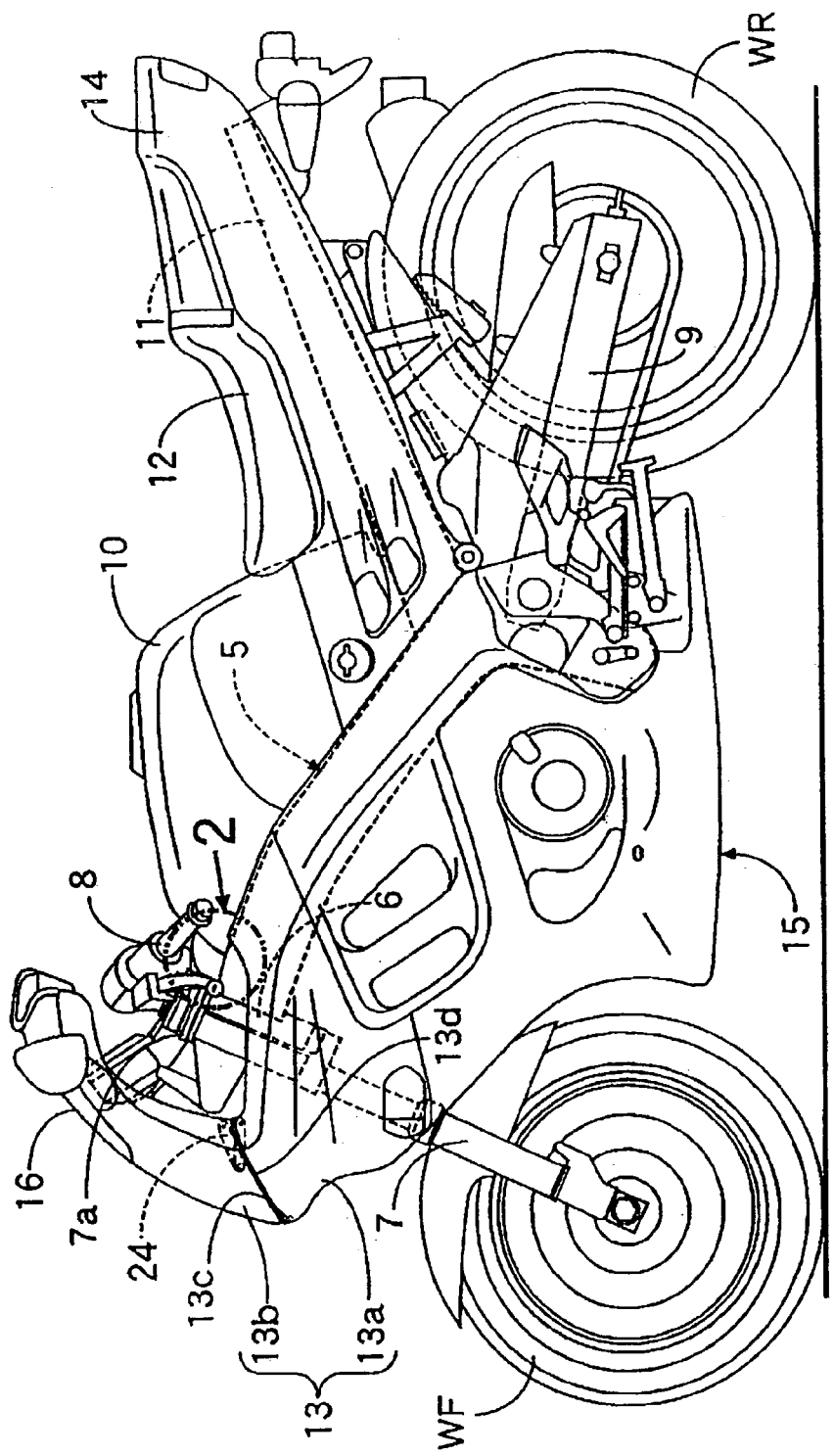
FIG. 1 is a side view showing a motorcycle equivalent to a first embodiment.

Embodiments of the invention shown in the attached drawings will be described below.

FIGS. 1 to 4 show a first embodiment of the invention, wherein a front fork 7 for supporting a front wheel WF is supported by a head pipe 6 with which a body frame 5 of the motorcycle is provided at the front end of the body frame so that the front fork can be steered. A steering handlebar 8 is attached to a top bridge 7a to which the upside of the front fork 7 is coupled. A swing arm 9 is supported by the rear of the body frame 5 so that the swing arm can be vertically oscillated and a rear wheel WR is supported by the rear end of the swing arm 9.

A fuel tank 10 is mounted on a front half of the body frame 5 and a tandem type seat 12 arranged at the back of the fuel tank 10 is provided on a seat rail 11 wherein the body frame 5 is provided to the rear of the body frame.

Most of the body frame 5 is covered with a body cover 15 made of synthetic resin and composed of a front cowl 13 and a rear cowl 14 and a windscreen 16 as a vehicular component is attached to the upside of the center of the front cowl 13 so that the windscreen is located in front of a rider on the seat 12.

Figure 2:
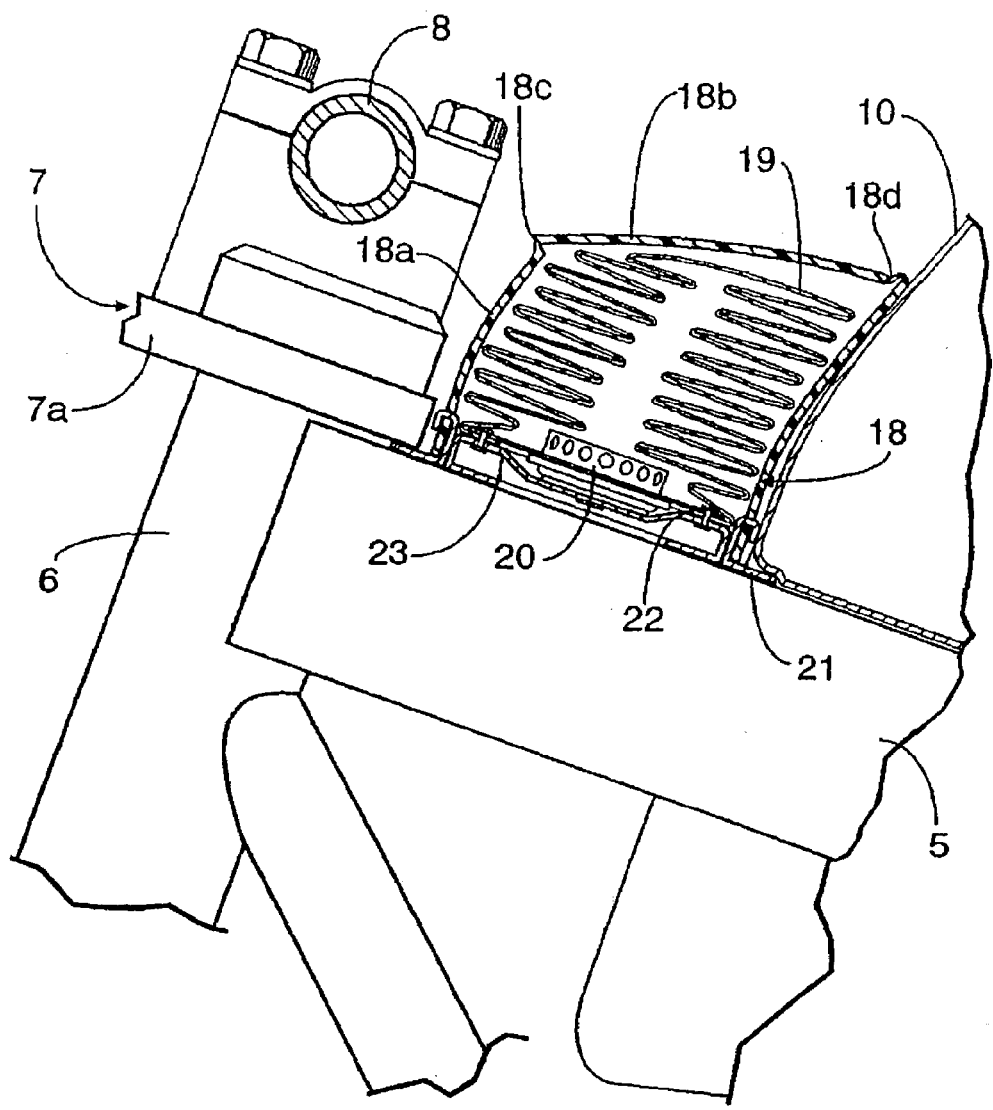
FIG. 2 is an enlarged longitudinal section viewed from direction shown by an arrow 2 in FIG. 1.

As shown in FIG. 2, an air bag module 17 is provided on the body frame 5 between the head pipe 6 and the fuel tank 10 for example, and the air bag module 17 is provided with an air bag housing 18, an air bag 19 housed in the air bag housing 18 and an inflator 20 that generates gas for inflating and extending the air bag 19.

The air bag housing 18 is provided with a housing barrel 18a that can house the air bag 19 in a folded state and a flap 18b that closes an opening at the upper end of the housing barrel 18a, is formed by light material made of synthetic resin like a cap and the downside of the housing barrel 18a is attached to the body frame 5 by an attachment piece 21 fixed to the body frame 5.

The flap 18b is coupled to the housing barrel 18a via a hinge 18c arranged in one location around the flap 18b, for example in one location on the side reverse to the fuel tank 10 and a weak part 18d arranged in a part except the hinge 18c around the flap 18b, and the weak part 18d is formed so that it can be easily burst.

An opening 22 of the air bag 19 is airtightly closed by a connector 23 fixed to the attachment piece 21 and the inflator 20 is attached to the inside of the connector 23.

A shock sensor (not shown) such as an acceleration sensor is attached to the body frame 5, the inflator 20 is operated when the shock sensor detects shock equal to or exceeding a predetermined value and supplies high-pressure gas into the air bag 19.

Figure 3:
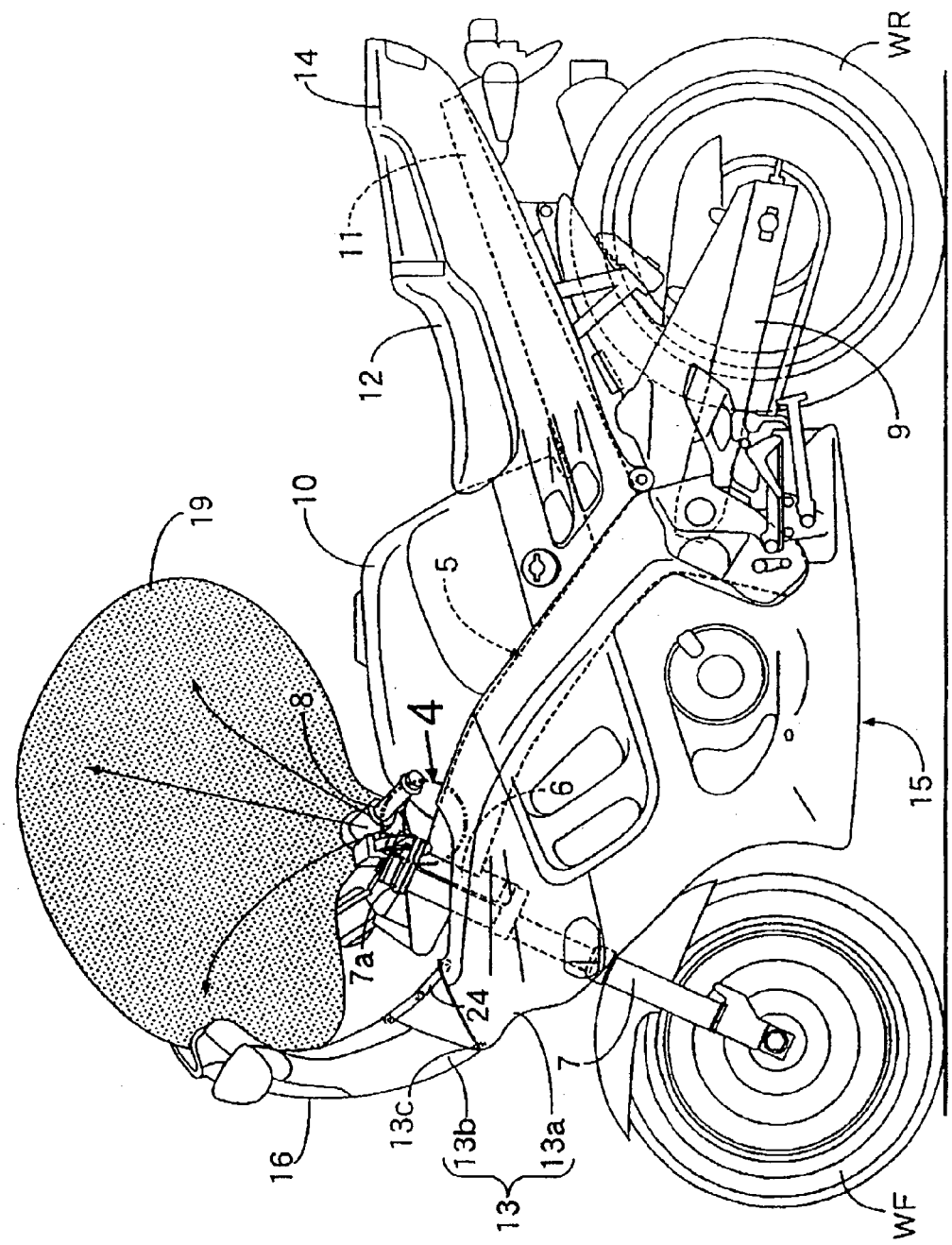
FIG. 3 is a side view corresponding to FIG. 1 in a state in which an air bag is inflated and extended.
Figure 4:
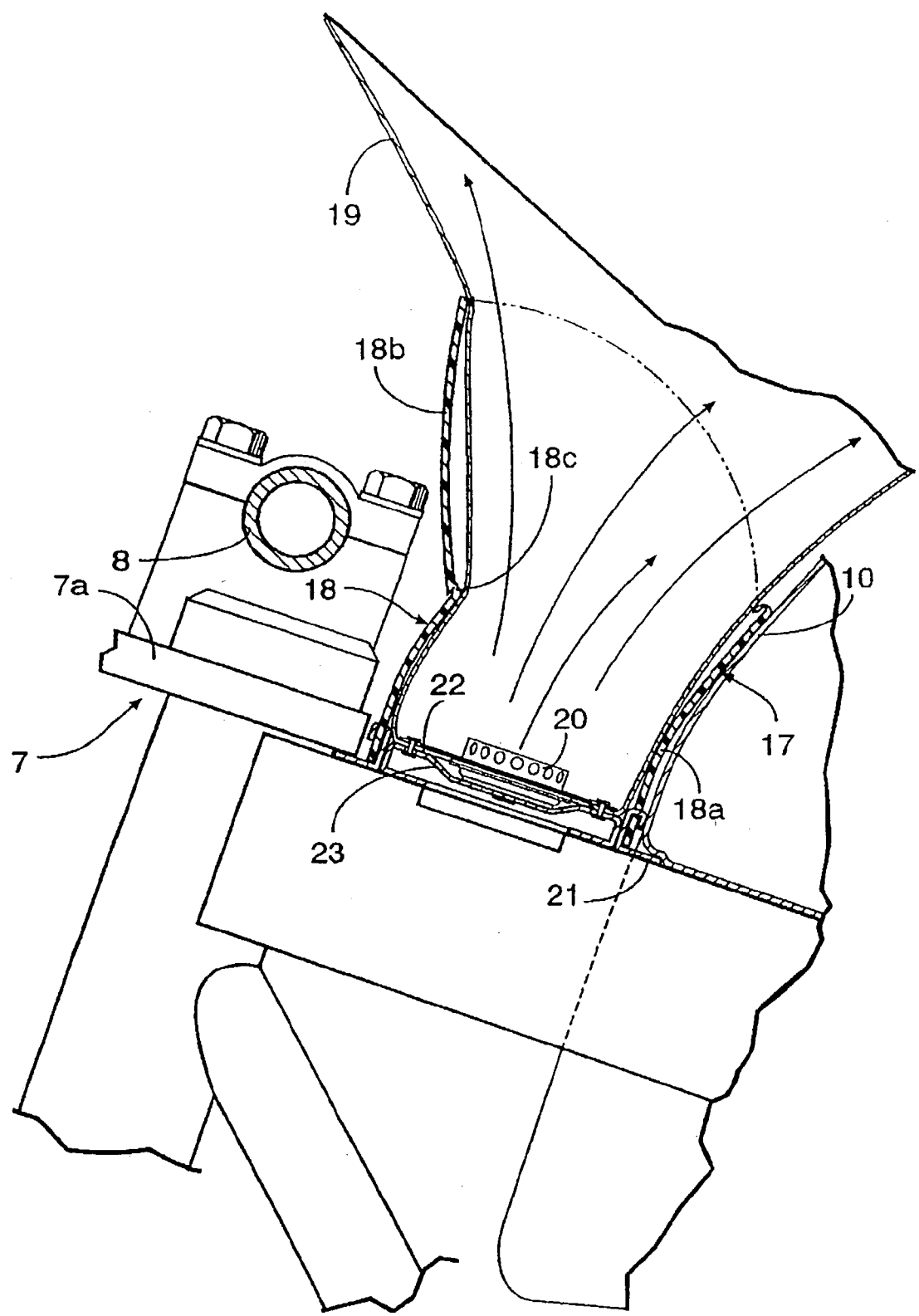
FIG. 4 is a longitudinal side view corresponding to FIG. 2 in a state in which the air bag is inflated and extended.

When the high-pressure gas is supplied from the inflator 20, the air bag 19 bursts the weak part 18d of the air bag housing 18, momentarily inflates and extends upwardly, opening the flap 18b as shown in FIGS. 3 and 4 and a rider seated on the seat 12 is constrained by the inflated and extended air bag 19 from a forward direction.

When the air bag 19 is inflated and extended, it comes in contact with the windscreen in front of the air bag. Therefore, when the windscreen is fixed, the inflated and extended space of the air bag 19 is narrowed.

Then, the windscreen 16 is attached to the upside of the center of the front cowl 13 so that the windscreen can be turned between an inactuated position (a position shown in FIG. 1) in which the air bag 19 is folded and an actuated position (a position shown in FIG. 3) in which the windscreen is displaced in the inflated and extended direction of the air bag 19 from the inactuated position, being engaged with and supporting a part of the inflated and extended air bag 19.

To enable the windscreen 16 to be turned, a hinge 13c for turning the windscreen 16 and a part of the front cowl 13 forward and a burst part burst when the inflated and extended air bag 19 impulsively comes in contact with the windscreen 16 from a backward direction are formed between a part 13b near to the windscreen 16 of the front cowl 13 and the rest 13a except the part 13b of the front cowl 13. That is, the windscreen 16 is supported by the rest 13a as fixed supporting means of the front cowl 13 when the windscreen is turned from the inactuated position to the actuated position.

A regulating link 24 for maintaining the actuated position is provided between the part 13b and the rest 13a of the front cowl 13 when the windscreen 16 is turned to the actuated position shown in FIG. 3 according to the inflation and extension of the air bag 19, and is folded when the windscreen 16 is located in the inactuated position.

Next, to explain the action of the first embodiment, as the windscreen 16 can be turned between the inactuated position in which the air bag 19 is folded and the actuated position in which the windscreen is displaced in the inflated and extended direction of the air bag 19 from the inactuated position, being engaged with and supporting a part of the inflated and extended air bag 19 and the windscreen is supported by the rest 13a of the front cowl 13, the windscreen 16 engaged by the inflated and extended air bag 19 is turned from the inactuated position to the actuated position in the inflated and extended direction of the air bag 19 when the air bag 19 is inflated and extended. Hereby, the forward space in which the air bag 19 is inflated and extended can be fully secured.

In addition, as the turned position of the windscreen 16 is maintained by the regulating link 24 in a state in which the windscreen is engaged with the air bag 19, the windscreen can securely support the air bag 19 under a load which acts on the air bag 19 from the rider.

In the first embodiment, the windscreen 16 and a part 13b of the front cowl 13 are turned, however, only the windscreen 16 may be also turned.

Figure 5:
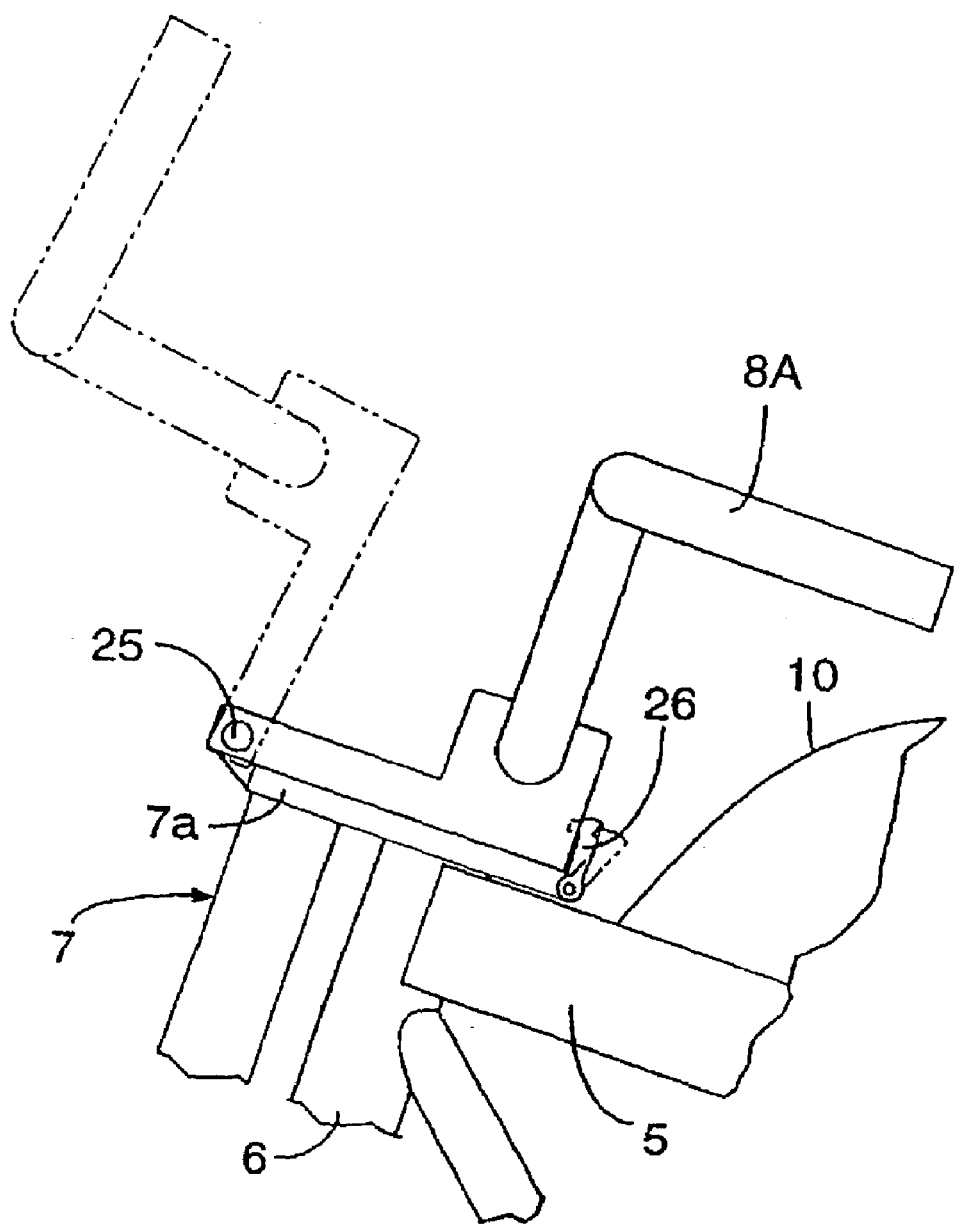
FIG. 5 is a side view showing a primary part in a second embodiment.

FIG. 5 shows a second embodiment of the invention. A steering handlebar 8A is supported by a spindle 25 as fixed supporting means fixed to a top bridge 7a to which the upside of a front fork 7 is coupled so that the steering handlebar can be turned between an inactuated position on the rear side (a position shown by a full line in FIG. 5) and an actuated position on the front side (a position shown by a chain line in FIG. 5). Besides, a locking mechanism 26 for releasing locking by shock in collision, the supply of high-pressure gas from an inflator 20 (refer to the first embodiment) for inflating and extending an air bag 19 or the supply of high-pressure gas from another inflator is provided between the steering handlebar 8A located in the inactuated position and the top bridge 7a.

The steering handlebar 8A may be turned from the inactuated position to the actuated position not only by the impulsive contact from a backward direction of the air bag 19 (refer to the first embodiment) but when the steering handlebar 8A is pressed by a spring on the side of the actuated position and when high-pressure gas is supplied from the inflator 20 for inflating and extending the air bag 19.

According to the second embodiment, when the air bag 19 is inflated and extended, the steering handlebar 8A is turned in the inflated and extended direction of the air bag 19 from the inactuated position to the actuated position, space for the air bag 19 to be inflated and extended forward can be fully secured, a load which acts on the air bag 19 from a rider is received by the steering handlebar 8A and the air bag 19 can be securely supported.

Figure 6:
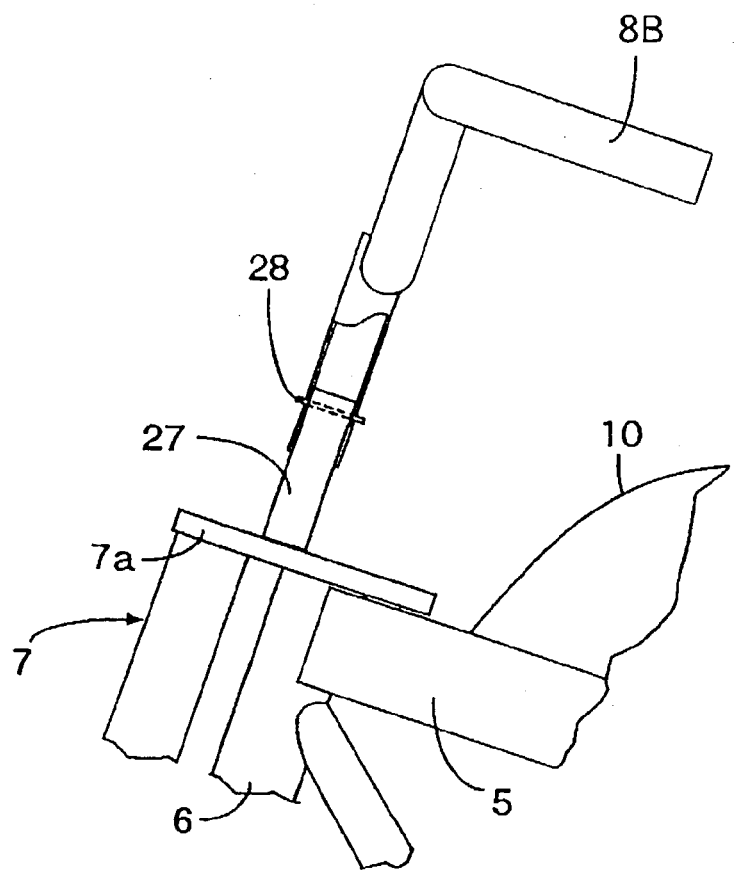
FIG. 6 is a longitudinal side view showing a primary part in a first transformed example of the second embodiment.

FIG. 6 shows a first transformed example of the second embodiment. A supporting sleeve 27 as supporting means fixed to a top bridge 7a to which the upside of a front fork 7 is coupled is fitted into the downside of a steering handlebar 8B so that the supporting sleeve can be relatively slid, and the steering handlebar 8B is supported by the supporting sleeve 27 so that the steering handlebar can be slid between an inactuated position on the upper side (a position shown in FIG. 6) and an actuated position on the lower side. In addition, a locking mechanism 28 in which locking is released by shock in collision, the supply of high-pressure gas from an inflator 20 for inflating and extending an air bag 19 or the supply of high-pressure gas from another inflator is provided between the steering handlebar 8B in the inactuated position and the supporting sleeve 27.

According to the first transformed example, when the air bag 19 is inflated and extended, the steering handlebar 8B is turned in the inflated and extended direction of the air bag 19 from the inactuated position to the actuated position, space for the air bag 19 to be inflated and extended forward and downward can be fully secured, a load which acts on the air bag 19 from a rider is received by the steering handlebar 8B and the air bag 19 can be securely supported.

Figure 7:
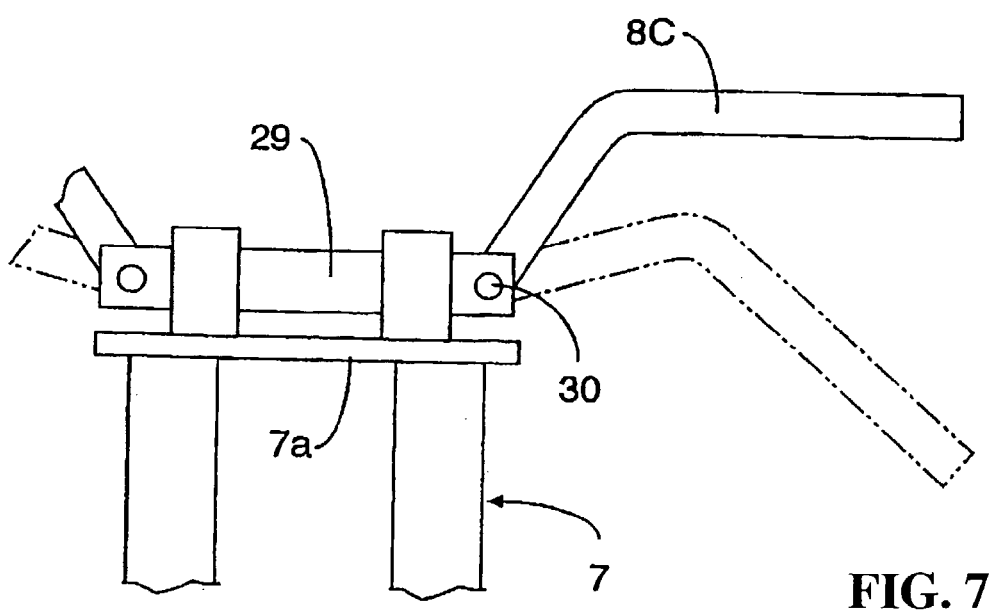
FIG. 7 is a front view showing a primary part in a second transformed example of the second embodiment.

FIG. 7 shows a second transformed example of the second embodiment. The base of a steering handlebar 8C is coupled to the end of a supporting sleeve 29 as supporting means fixed to a top bridge 7a to which the upside of a front fork 7 is coupled so that the base can be vertically turned, and the steering handlebar 8C is supported by the supporting sleeve 29 via a shaft 30 so that the steering handlebar can be turned between an inactuated position on the upper side (a position shown in FIG. 7) and an actuated position on the lower side. In addition, a locking mechanism (not shown) in which locking is released by shock in collision, the supply of high-pressure gas from an inflator 20 for inflating and extending an air bag 19 or the supply of high-pressure gas from another inflator is provided between the steering handlebar 8C in the inactuated position and the supporting sleeve 29.

According to the second transformed example, when the air bag 19 is inflated and extended, the steering handlebar 8C is turned in the inflated and extended direction of the air bag 19 from the inactuated position to the actuated position, space for the air bag 19 to be inflated and extended sideway can be fully secured, a load which acts on the air bag 19 from a rider is received by the steering handlebar 8C and the air bag 19 can be securely supported.

The embodiments of the invention have been described, however, the invention is not limited to the embodiments and various design changes without deviating from the invention described in the scope are allowed.

As described above, according to the invention according to the first aspect, the inflated and extended space of the air bag can be fully secured, in addition, a load which acts on the air bag from a rider is received and the air bag can be securely supported.

Besides, according to the invention according to the second aspect, space for the air bag to be inflated and extended forward can be fully secured.

Further, according to the invention according to the third aspect, space for the air bag to be inflated and extended forward or sideways can be fully secured.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A compact vehicle comprising:
an air bag normally stored in a folded condition and being selectively deployed to an inflated and extended air bag condition upon the occurrence of a predetermined condition;
a vehicular component positioned to be engageable with the inflated and extended air bag when said air bag is inflated and extended;
means for turning said vehicular component between an inactuated position in which the air bag is folded and an actuated position in which the vehicular component is displaced from the inactuated position when the vehicular component is engaged with a portion of the inflated and extended air bag;
wherein the vehicular component is a windscreen arranged in front of the compact vehicle.

2. The compact vehicle according to claim 1, wherein said windscreen is hinged to said compact vehicle and further including a link operatively mounted between the compact vehicle and the windscreen for limiting the distance the windscreen moves from the inactuated position to the actuated position.

3. The compact vehicle according to claim 2, wherein said windscreen is turned to the actuated position when the inflated and extended air bag impulsively comes in contact with the windscreen.

4. A compact vehicle comprising:
an air bag normally stored in a folded condition and being selectively deployed to an inflated and extended air bag condition upon the occurrence of a predetermined condition;
a vehicular component positioned to be engageable with the inflated and extended air bag when said air bag is inflated and extended;
means for turning said vehicular component between an inactuated position in which the air bag is folded and an actuated position in which the vehicular component is displaced from the inactuated position when the vehicular component is engaged with a portion of the inflated and extended air bag;
wherein the vehicular component is a steering handlebar.

5. The compact vehicle according to claim 4, wherein said steering handlebar is supported by a spindle for selectively permitting said steering handlebar to be turned from the inactuated position to the actuated position.

6. The compact vehicle according to claim 5, and further including a locking mechanism for releasing locking by a predetermined shock due to a collision.

7. The compact vehicle according to claim 5, and further including a locking mechanism for releasing locking by a supply of high-pressure gas from an inflator for inflating and extending the air bag.

8. The compact vehicle according to claim 5, and further including a locking mechanism for releasing locking by a supply of high-pressure gas from a second inflator provided adjacent to the steering handlebar.

9. The compact vehicle according to claim 5, wherein the steering handlebar is turned from the inactuated position to the actuated position upon an impulsive contact from an inflated and extended air bag and when the steering handlebar is pressed by a spring on the side of the actuated position and when a supply of high-pressure gas is supplied from an inflator for inflating and extending the air bag.

10. A vehicular component actuating mechanism for use with a compact vehicle comprising:
an air bag normally stored in a folded condition and being selectively deployed to an inflated and extended air bag condition upon the occurrence of a predetermined condition;
a vehicular component positioned to be engageable with the inflated and extended air bag when said air bag is inflated and extended;
means for turning said vehicular component between an inactuated position in which the air bag is folded and an actuated position in which the vehicular component is displaced from the inactuated position when the vehicular component is engaged with a portion of the inflated and extended air bag;
wherein the vehicular component is a windscreen arranged in front of the compact vehicle.

11. The vehicular component actuating mechanism for use with a compact vehicle according to claim 10, wherein said windscreen is hinged to said compact vehicle and further including a link operatively mounted between the compact vehicle and the windscreen for limiting the distance the windscreen moves from the inactuated position to the actuated position.

12. The vehicular component actuating mechanism for use with a compact vehicle according to claim 11, wherein said windscreen is turned to the actuated position when the inflated and extended air bag impulsively comes in contact with the windscreen.

13. A vehicular component actuating mechanism for use with a compact vehicle comprising:
   an air bag normally stored in a folded condition and being selectively deployed to an inflated and extended air bag condition upon the occurrence of a predetermined condition;
   a vehicular component positioned to be engageable with the inflated and extended air bag when said air bag is inflated and extended;
   means for turning said vehicular component between an inactuated position in which the air bag is folded and an actuated position in which the vehicular component is displaced from the inactuated position when the vehicular component is engaged with a portion of the inflated and extended air bag;
   wherein the vehicular component is a steering handlebar.

14. The vehicular component actuating mechanism for use with a compact vehicle according to claim 13, wherein said steering handlebar is supported by a spindle for selectively permitting said steering handlebar to be turned from the inactuated position to the actuated position.

15. The vehicular component actuating mechanism for use with a compact vehicle according to claim 14, and further including a locking mechanism for releasing locking by a predetermined shock due to a collision.

16. The vehicular component actuating mechanism for use with a compact vehicle according to claim 14, and further including a locking mechanism for releasing locking by a supply of high-pressure gas from an inflator for inflating and extending the air bag.

17. The vehicular component actuating mechanism for use with a compact vehicle according to claim 14, and further including a locking mechanism for releasing locking by a supply of high-pressure gas from a second inflator provided adjacent to the steering handlebar.

18. The vehicular component actuating mechanism for use with a compact vehicle according to claim 14, wherein the steering handlebar is turned from the inactuated position to the actuated position upon an impulsive contact from an inflated and extended air bag and when the steering handlebar is pressed by a spring on the side of the actuated position and when a supply of high-pressure gas is supplied from an inflator for inflating and extending the air bag.

19. A compact vehicle comprising:
   an air bag housing;
   an air bag normally stored in a folded condition in the air bag housing and being selectively deployed to an inflated and extended air bag condition upon the occurrence of a predetermined condition;
   an air bag flap covering an opening of the air bag housing in which the air bag is deployed through to the inflated and extended air bag condition;
   a vehicular component positioned to be engageable with the inflated and extended air bag when said air bag is inflated and extended;
   means for turning said vehicular component between an inactuated position in which the air bag is folded and an actuated position in which the vehicular component is displaced from the inactuated position when the vehicular component is engaged with a portion of the inflated and extended air bag;
   wherein the vehicular component is independent of the air bag housing and the air bag flap, and
   wherein the vehicular component is a steering handlebar or a wind screen.

20. The compact vehicle according to claim 19, wherein the vehicular component is placed around the air bag housing.

21. The compact vehicle according to claim 19, wherein the vehicular component is placed near the air bag housing.

22. The compact vehicle according to claim 19, wherein the vehicle is a motorcycle.

* * * * *